No. 12,031. Reissued Sept. 16, 1902.
F. W. DUNBAR.
TELEPHONE SYSTEM.
(Application filed June 17, 1902.)
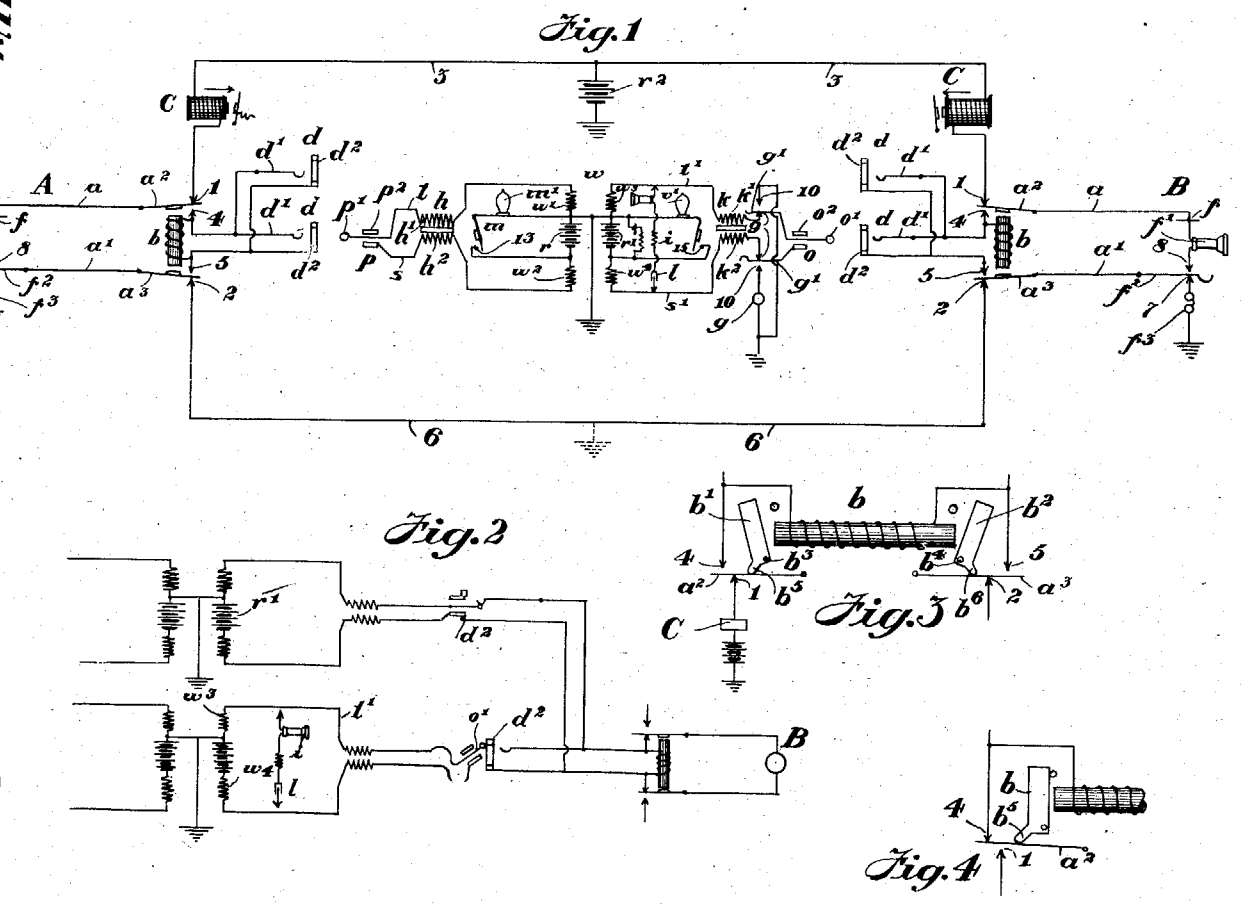
Witnesses:
Ira D. Perry
Robert Lewis Ames.
Inventor:
Francis W. Dunbar
by Jones & Addington
Attys.
PETERS CO., PHOTO-LITHO., WASHINGTON, D.

UNITED STATES PATENT OFFICE.

FRANCIS W. DUNBAR, OF CHICAGO, ILLINOIS, ASSIGNOR TO THE KELLOGG SWITCHBOARD AND SUPPLY COMPANY, OF CHICAGO, ILLINOIS, A CORPORATION OF ILLINOIS.

TELEPHONE SYSTEM.

SPECIFICATION forming part of Reissued Letters Patent No. 12,031, dated September 16, 1902.

Original No. 689,953, dated December 31, 1901. Application for reissue filed June 17, 1902. Serial No. 112,060.

*To all whom it may concern:*

Be it known that I, FRANCIS W. DUNBAR, a citizen of the United States, residing at Chicago, in the county of Cook and State of Illinois, have invented new and useful Improvements in Telephone Systems, (Case No. 88,) of which the following is a full, clear, concise, and exact description, reference being had to the accompanying drawings, forming a part of this specification.

My invention relates to a telephone system, my object being, first, to provide improved means for disconnecting the subscriber's indicator or annunciator from circuit when connection is made with the line; second, to provide an improved form of test for multiple-switchboard systems, and, third, to provide an improvement upon the system shown in my Patent No. 686,272, dated November 12, 1901.

In said application above mentioned I have shown a system wherein the contacts of the connection-terminal are normally disconnected from the limbs of the telephone-line and are adapted to be connected therewith for conversation through the agency of a relay which is actuated when a connecting-plug is inserted in the spring-jack or socket belonging to the line. In said application I have shown local circuit which is adapted to be closed by the insertion of the connecting-plug to energize the relay, and in accordance with the present invention I employ a portion of the talking-circuit for this purpose. In the preferred form of my invention I associate the winding of the relay with the limbs of the talking-circuit, so that when the charging-battery at the central station is connected with the line by the insertion of the connecting-plug the current from the charging-battery traverses the relay to energize the same. I preferably bridge the relay directly between the two limbs of the metallic talking-circuit, although this is not essential, and the talking-circuit may be otherwise utilized for this purpose. For instance, in application Serial No. 52,315, filed March 22, 1901, Case No. 20, I have shown the relay connected between one limb of the talking-circuit and ground, whereby the current for actuating the relay passes over one limb of the talking-circuit with return through the earth. In either case the current for operating the relay passes over the strand of the cord connector and through the main terminal of the plug and a line-contact of the switch-socket. In the present invention I have inserted claims generic in scope and have also inserted claims to the specific manner of connecting the relay illustrated herein, and in said application last above mentioned I have inserted specific claims to the particular manner of connecting the relay in circuit illustrated in said application.

It has been the usual practice heretofore in removing the individual indicator from circuit to provide a relay included in a local circuit adapted to be closed upon the insertion of a connecting-plug; and it is the object of the present invention to provide means for utilizing the talking-circuit for actuating the relay which disconnects the individual indicator from circuit.

In accordance with the present invention when applied to multiple switchboards I dispense with the additional contact usually provided upon the spring-jack for testing purposes and utilize one of the line-contacts for the test-terminal. When the line is not in use, the line-contact of the spring-jack or switch-socket employed for the testing-contact is disconnected from the portions of the limbs of the telephone-line extending to the substation and is also disconnected from the individual indicator and the central-station circuits. The line-contact of the spring-jack is thus free from all extraneous currents or sources of electricity that might impart thereto a difference of potential from the earth or central-office common return when the line is not in use. Accordingly I may rely upon the main-line contact of the spring-jack as a test-terminal. I provide means for charging the line-terminal to a difference of potential from the earth or central-office common return when connection is made with the line, so that the operator may test at any board, and if she finds the terminal charged to a difference of potential from the earth or central-office common return she will know by the click in her telephone that the line is busy.

I have illustrated my invention in the accompanying drawings, in which—

Figure 1 is a diagram showing two subscribers' lines and the central-station connecting apparatus. Fig. 2 is a diagram showing the testing-circuits. Fig. 3 is a view illustrating the relay which I preferably employ. Fig. 4 is a view illustrating one end of the relay, with the armature attracted.

Like characters refer to like parts in the several figures.

The line of subscriber A extends in two limbs $a$ $a'$ to the central station, the limb $a$ terminating in a spring $a^2$ and the limb $a'$ in a spring $a^3$. The spring $a^2$ normally engages contact 1, connected through individual annunciator or indicator $c$ and conductor 3 to ground through battery $r^2$, while the contact 2 is connected with the conductor 6, which is common to a plurality of the lines. The springs $a^2$ and $a^3$ carry armatures resting, respectively, opposite the poles of a relay $b$, one end of said relay being connected with contact 4, with which spring $a^2$ is adapted to engage when the relay is energized, and also with the line-springs $d'$ $d'$ upon the several spring-jacks $d$ $d$ of the multiple switchboard. The opposite end of the winding of relay $b$ is connected with contact 5, with which spring $a^3$ is adapted to engage, and also with the line-terminals $d^2$ $d^2$ of the spring-jacks. The subscriber is provided at the substation with the usual microphone $f$, receiver $f'$, and switch-hook $f^2$, the latter being adapted when the line is not in use to engage contact 7, which is connected through bell $f^3$ to ground. When the telephone is removed from the hook, the hook engages contact 8, which is connected with the telephone transmitter and receiver. The apparatus and circuits of subscriber B (shown upon the right of the drawings) are the same as those provided in connection with subscriber A, and like letters have been employed for indicating like parts.

The answering-plug $p$ is provided with a tip $p'$, connected with the tip-strand $t$, and with a sleeve $p^2$, connected with the sleeve-strand $s$. The calling-plug $o$ is provided with a tip $o'$, connected with the tip-strand $t'$, and with a sleeve $o^2$, connected with the sleeve-strand $s'$. The plugs and the strands connected therewith are united through a repeating-coil $w$, having windings $w'$ $w^2$, connected between the strands $t$ and $s$, and windings $w^3$ $w^4$, connected between the strands $t'$ and $s'$. A battery $r$ is interposed between the windings $w'$ and $w^2$ and a battery $r'$ between the windings $w^3$ and $w^4$. One pole of each of the batteries is connected to ground. In the strands $t$ and $s$, respectively, are included the windings $h'$ $h^2$ of a relay $h$, while in the strands $t'$ and $s'$, respectively, the windings $k'$ and $k^2$ of the relay $k$ are included. The windings of the relays are wound upon their respective cores, so that, due to the passage of the battery-current through the metallic talking-circuit, the currents traversing the two windings of each relay will neutralize the core thereof, so that the relays will be inert while the lines are connected together for conversation. These relays in their individual capacity are not my invention. Opposite the pole of relay $h$ is mounted a spring $m$, which carries the armature of said relay, said springs being adapted when attracted to engage contact 13 to thereby close circuit of battery $r$ through lamp $m'$. Likewise a spring $v$ is mounted opposite relay $k$ and is adapted to engage contact 15 to close circuit of battery $r'$ through lamp $v'$. The operator's telephone set $i$ is adapted to be connected between the strands $t'$ and $s'$, and a condenser $l$ is included in circuit therewith. The calling-generator $g$, adapted to produce the usual alternating current, is grounded upon one side and is also connected with contacts 10 10, adapted to be engaged by the springs $g'$ $g'$ of the ringing-key when said springs are moved out of engagement with contacts 9 9, with which they normally engage. When the ringing-key is depressed to move the springs $g'$ $g'$ from contacts 9 to contacts 10, the sleeve of the plug is grounded through the generator, and the generator is also bridged between the tip and the sleeve of the calling-plug.

The relay $b$ is constructed so that the same will respond to alternating as well as to continuous currents for the purpose hereinafter described. To render the relay thus responsive to alternating currents, the armatures are mounted so that the same are withdrawn from the poles of the core of the relay by gravity. The withdrawal of the armatures is thus sluggish, and upon the passage of an alternating current a succeeding alternation will magnetize the core to cause the same to grasp the armature before the armature has had time to be withdrawn upon the cessation of the magnetism due to the immediately-preceding alternation. As shown in Fig. 3, the armatures $b'$ $b^2$ are pivoted at $b^3$ $b^4$, respectively, so that the weight of the armatures serves to withdraw the same from the core. The armatures are provided with arms $b^5$ $b^6$, respectively, the arm $b^5$ being adapted to engage the spring $a^2$, while the arm $b^6$ is adapted to engage the spring $a^3$. When the relay is unenergized, the arm $b^5$ holds spring $a^2$ in engagement with contact 1, and the arm $b^6$ holds spring $a^3$ in engagement with contact 2. When the armatures are attracted, the arms $b^5$ and $b^6$ are moved to permit the springs $a^2$ and $a^3$ to engage, respectively, contacts 4 and 5. During the passage of a continuous current the armatures will be continuously held against the poles of the core, due to a constant magnetic pull. When, however, an alternating current traverses the relay, the armatures are held continuously against the core, due to an intermittent magnetic pull the pulsations of which are too rapid to permit the armatures to recede from the poles appreciably between the pulsations.

Supposing subscriber A is desirous of conversing with subscriber B, he lifts the telephone-receiver from the hook, thereby closing together limbs $a$ $a'$ at the substation. The circuit of battery $r^2$ is thereby closed from ground over conductor 3, indicator $c$, limb $a$, the substation apparatus, limb $a'$, conductor 6 to ground through the grounded lines of connected subscribers, all of whose lines are connected with conductor 6. The individual annunciator $c$ is thereby actuated to convey to the operator the signal for connection. The operator thereupon lifts answering-plug $p$ and inserts the same in the spring-jack belonging to the line of subscriber A. The insertion of the plug closes the circuit of battery $r$ through strand $t$, tip $p'$, line-spring $d'$, relay $b$, sleeve $d^2$, sleeve $p^2$, strand $s$, back to the battery. The relay $b$ is thus actuated, and springs $a^2$ and $a^3$ are moved out of engagement, respectively, with contacts 1 and 2 and into engagement, respectively, with contacts 4 and 5. The individual annunciator $c$ is thus disconnected from the circuit, and the limbs of the telephone-line are connected with the line-terminals of the spring-jack. The circuit of battery $r$ over the strands $t$ and $s$ and limbs $a$ $a'$ of the telephone-line is thus completed. The operator then bridges in her telephone set, and learning that subscriber B is the subscriber called for lifts calling-plug $o$ and touches the tip $o'$ thereof to the sleeve $d^2$ of the spring-jack belonging to the line of subscriber B. If the subscriber B is busy, she will hear a click in her telephone; otherwise she will hear no sound. If subscriber B is busy, the sleeves of the spring-jacks connected with his line will be charged to a difference of potential relative to earth or central-office common, and upon touching the tip of the calling-plug to the sleeve at any board a current will flow to ground or the central-office common return, which will cause a click in the operator's telephone. The testing-circuit is shown in Fig. 2. Assuming that subscriber B is connected for conversation at the upper spring jack shown in the diagram, the battery $r'$ of the pair of cord connectors illustrated at the top of the figure will have one pole connected to ground and the other pole connected with the sleeves $d^2$ $d^2$ of the spring-jacks belonging to subscriber B. The battery will thus serve to charge said sleeves to a difference of potential relative to the earth. When the operator touches the tip $o'$ of the calling-plug to the sleeve $d^2$, as shown at the bottom of the figure, the current from battery $r'$ finds a path through tip $o'$ of the testing-plug, strand $t'$, winding $w^3$ of the repeating-coil to ground. The closing and opening of the circuit caused by touching the tip $o'$ to the sleeve and the removal of the same therefrom causes a current of self-induction from winding $w^3$ to traverse the local circuit, including the windings $w^3$ and $w^4$ and the receiver of the operator's telephone, and the induced currents thus produce the click in the operator's telephone-receiver, which indicates to her that the line is busy. While I preferably employ one of the main-line contacts as the test-terminal, it will be understood that a separate test-terminal may be employed, if desired. Assuming that the operator finds the line of subscriber B to be disengaged, she inserts the calling-plug into the spring-jack and then depresses the ringing-key, thus sending current from ground through the calling-generator $g$, sleeve $o$, terminal $d^2$, limb $a'$, through the bell $f^3$ to ground at the substation. Since the depressing of the ringing-key serves to open the strands $t'$ $s'$ at the rear of the ringing-key, thus disconnecting the battery $r'$ from the relay $b$, the relay would become unenergized and would disconnect the limbs $a$ and $a'$ from the spring-jack terminals were not some means provided for energizing the relay during the time the battery $r'$ is removed from circuit. This may be accomplished in any preferred manner; but I preferably accomplish the same by constructing the relay to respond to alternating currents in the manner hereinbefore described, whereby the alternating current from the generator may serve to energize the relay during the time the battery $r'$ is disconnected. It will be noted that the generator $g$ is bridged between the two terminals of the plug to energize the relay and is connected between ground and the sleeve of the plug to operate the subscriber's bell. When the subscriber B responds and lifts his telephone-receiver from the hook, the subscribers are connected for conversation. During conversation the battery $r$ is connected in circuit with the strands $t$ and $s$ and the limbs $a$ $a'$ of subscriber A, and the battery $r'$ is connected in circuit with the strands $t'$ and $s'$ and limbs $a$ $a'$ of subscriber B. Talking-currents passing over either circuit will be transmitted to the other circuit through the windings of the repeating-coil $w$.

Where I have spoken of indicators or annunciators I contemplate any form of signaling device—such, for instance, as an annunciator having a visual signal, a relay adapted to control a lamp, or any other electromagnet or electrically-operated signaling device.

Throughout this specification I have referred to spring-jacks, connection terminals, and switch-sockets. Wherever the terms are employed in the following claims I desire it to be understood that they refer to such organizations as a whole rather than to their individual parts; but wherever in said claims a portion only of the spring-jack is meant such distinction is clearly pointed out. By the expressions "operative relation with the line" and "inoperative relation with the line" in reference to the spring-jacks I mean such a relation between the spring-jacks and the line-circuit as will or will not enable the spring-jacks to perform their usual functions with respect to the line. One, and of course the most important, of such functions is to form a means for continuing the talking-circuit from the line to other portions of the system.

While I have illustrated my invention in connection with cord-connectors of particular type, it will be understood that my invention may be equally employed with other forms of connecting means at the central station, and while I have illustrated my invention in connection with a multiple-switchboard system it will be understood that the features of my invention, except the test, are equally applicable to telephone systems of the single or divided board type.

Having described my invention, what I claim as new, and desire to secure by Letters Patent, is—

1. The combination with a telephone-line, and a connection-terminal therefor, of a signal-controlling electromagnet normally connected with said line, a relay for disconnecting said electromagnet from the line, a cord-circuit terminating in a connecting-plug and adapted to be placed in conductive relation with the line, a source of electricity associated with the cord-circuit and adapted to be placed in the metallic circuit of the line, and means for closing the circuit of said source through said relay when connection is made with the line, said relay-circuit including a talking-strand of the cord-circuit, a main terminal of the connecting-plug, a line-contact and a portion of a talking-limb of the telephone-line with suitable return, substantially as described.

2. The combination with a telephone-line, of line-contacts therefor, a signal-controlling electromagnet normally connected therewith, a relay for disconnecting said electromagnet from the line, a cord-circuit terminating in a connecting-plug, and means for closing circuit through said relay over a circuit including the talking-strands of the cord-circuit, the main terminals of the connecting-plug, and the line-contacts of the telephone-line, substantially as described.

3. The combination with a telephone-line, of line-contacts therefor, a signal-controlling electromagnet normally connected therewith, a relay for disconnecting said electromagnet from the line, the windings of said relay being adapted to be connected between the opposite limbs of the telephone-line, a cord-circuit terminating in a connecting-plug, and means for closing circuit through said relay over a circuit including the talking-strands of the cord-circuit, the terminals of the connecting-plug, the line-contacts of the telephone-line and the portions of the talking-limbs of the telephone-line extending between the line-contacts and the winding of said relay, substantially as described.

4. The combination with a telephone-line, of a connection-terminal at the central station, a signal-controlling electromagnet normally connected therewith, a relay for disconnecting said electromagnet from the line, and having a winding adapted to be connected between the limbs of the telephone-line, a cord connector terminating in a connecting-plug, a source of electricity connected between the strands of said cord connector, said source being adapted when the connecting-plug is inserted in the connection-terminal to send current over a circuit including the talking-strands of said cord connector, the terminals of the connecting-plug, the line-contacts of the telephone-line, and the portions of the talking-limbs of the telephone-line extending between said line-contacts and the relay, substantially as described.

5. The combination with a calling telephone-line and a connection-terminal normally disconnected therefrom, of a relay for connecting said connection-terminal with the line, a cord-circuit terminating in a connecting-plug, a source of electricity adapted to be included in the metallic circuit of the line to furnish current for talking purposes, and means for closing the circuit of said source through said relay when connection is made with the line in response to the call, said relay-circuit including one of the main terminals of the connecting-plug and a line-contact of the telephone-line, with suitable return, substantially as described.

6. The combination with a metallic telephone-line and a connection-terminal normally disconnected therefrom, of a relay for connecting said connection-terminal with the line, a cord-circuit terminating in a connecting-plug, a source of talking-current adapted to send current over the metallic circuit, and means for closing the circuit of said source through said relay when connection is made with the line, said relay-circuit including a talking-strand of the cord-circuit, a main terminal of the connecting-plug, a line-contact and a portion of a talking-limb of the telephone-line, substantially as described.

7. The combination with a telephone-line and a connection-terminal normally disconnected therefrom, of a relay for connecting said connection-terminal with the line, a cord-circuit terminating in a connecting-plug, and means for closing circuit through said relay continually during a connection and over a circuit including the talking-strands of the cord-circuit, the main terminals of the connecting-plug and the line-contacts of the connection-terminal, substantially as described.

8. The combination with a telephone-line and a connection-terminal normally disconnected therefrom, of a relay for connecting said connection-terminal with the line, a cord-circuit terminating in a connecting-plug, the winding of said relay adapted to be connected between the opposite limbs of the telephone-line, and means for sending current through said relay over a metallic circuit including the talking-strands of the cord connectors, the terminals of the connecting-plug, the line-contacts of the telephone-line and the portions of the talking-limbs of the telephone-line extending between the line-contacts and the winding of said relay, substantially as described.

9. The combination with a telephone-line and a connection-terminal normally disconnected therefrom, of a relay for connecting said connection-terminal with the line, and having a winding adapted to be connected between the limbs of the telephone-line, a cord-connector terminating in a connecting-plug, a source of electricity connected between the strands of said cord connector, said source being adapted when the connecting-plug is inserted in the connection-terminal to send current over a metallic circuit including the talking-strands of said cord connector, the terminals of the connecting-plug, the line-contacts of the telephone-line, and the portions of the talking-limbs of the telephone line extending between said line-contacts and the relay, substantially as described.

10. The combination with a telephone-line adapted to be included in a talking-circuit, of a signal-controlling electromagnet normally connected therewith, a connection-terminal normally disconnected from said line, a relay for disconnecting said electromagnet from the line and for connecting said connection-terminal with the line, a central source of current adapted to be connected in the metallic circuit of the line to furnish current for talking purposes, and means for closing circuit through said relay over a portion of the talking-circuit when connection is made with the line, substantially as described.

11. The combination with a telephone-line, of a signal-controlling electromagnet normally connected therewith, a connection-terminal normally disconnected from said line, a relay for disconnecting said electromagnet from the line and for connecting said connection-terminal with the line, a cord connector terminating in a connecting-plug, a charging source of electricity connected therewith and adapted to be included in the metallic circuit of the line to furnish current for talking purposes, and means for closing the circuit of said source through said relay over a circuit including a talking-strand of the cord connector, a main terminal of the connecting-plug, a line-contact of the connection-terminal and a portion of the talking-limb of the telephone-line, substantially as described.

12. The combination with a telephone-line, of a signal-controlling electromagnet normally connected therewith, a connection-terminal normally disconnected from said line, a relay for disconnecting said electromagnet from the line and for connecting said connection-terminal with the line, a cord connector terminating in a connecting-plug and means for closing circuit through said relay over a metallic circuit including the talking-strands of the cord connector, the main terminals of the connecting-plug and the line-contacts of the connection-terminal, substantially as described.

13. The combination with a telephone-line, of a signal-controlling electromagnet normally connected therewith, a connection-terminal normally disconnected from said line, a relay for disconnecting said electromagnet from the line and for connecting said connection-terminal with the line, and having a winding adapted to be connected between the limbs of the telephone-line, a cord connector terminating in a connecting-plug, a source of electricity connected between the strands of said cord connector, said source of electricity being adapted when the connecting-plug is inserted in the connection-terminal to send current over a metallic circuit including the talking-strands of said cord connector, the terminals of the connecting-plug, the line-contacts of the telephone-line, and the portion of the talking-limbs of the telephone-line extending between said line-contacts and the relay, substantially as described.

14. The combination with a telephone-line having two limbs extending to the central station, of a connection-terminal for the line, a relay having movable contact members in which said limbs terminate, a magnet for actuating said movable members having the opposite ends of the winding connected between the line-contacts of the connection-terminal, back contacts for said movable relay members, a signal-controlling electromagnet included between said back contacts, front contacts for said relay members connected respectively with the line-contacts of the connection-terminal, a cord-circuit terminating in a connecting-plug, and a source of electricity associated with the cord-circuit, whereby when the connecting-plug is inserted in the connection-terminal, the circuit of said source is closed through the winding of said relay, substantially as described.

15. The combination with a telephone-line, of a connection-terminal normally disconnected therefrom, a relay for connecting said connection-terminal with the line, a central source of current adapted to be connected in the metallic circuit for talking purposes, means for operating said relay from said source when connection is made with the line by current flowing over a path including a portion of the talking-circuit, and means for sending a calling-current over the line of the called subscriber only and at the same time maintaining said relay in operated condition, substantially as described.

16. The combination with a telephone-line, of a connection-terminal normally disconnected therefrom, a relay for connecting said connection-terminal with the line, a charging source of electricity, and a calling source of electricity, said charging source of electricity being adapted to energize said relay when connection is made with the line, a ringing-key for connecting said calling source with the line of a called subscriber, and for disconnecting said charging source therefrom, and means for temporarily energizing said relay during the time the charging source is disconnected by the ringing-key, substantially as described.

17. The combination with a telephone-line, of a connection-terminal at the central station normally disconnected therefrom, a relay for connecting said connection-terminal with the line, a charging source of electricity adapted to energize said relay when connection is made with the line, a ringing-key adapted to disconnect said charging source from the line of a called subscriber during the sending of a calling-current, and a supplemental source of electricity adapted to temporarily energize said relay during the time said charging source is disconnected from the line, substantially as described.

18. The combination with a telephone-line, of a connection-terminal normally disconnected therefrom, a relay for connecting said connection-terminal with the line, said relay being adapted to respond to continuous and to non-continuous currents, a charging source of electricity adapted to energize said relay when connection is made with the line, a calling source of electricity adapted to transmit a non-continuous current, a ringing-key for connecting said calling source of electricity with the line of a called subscriber, and for disconnecting said charging source therefrom, said calling source being adapted to temporarily energize said relay during the time said charging source is disconnected from the line, substantially as described.

19. The combination with a telephone-line, of one of the talking-contacts of a spring-jack associated with said line, said contact being normally insulated from the line and from earth, a plug, a cord-circuit, a battery associated with said circuit to raise the potential of said talking-contact above that of the earth while the line is in use and adapted to be included in the metallic circuit of the line to furnish current for talking purposes, and a relay operated from said source to connect said contact with the line during such use, substantially as described.

20. The combination with a metallic telephone-line, of a talking-contact forming a part of a connection-terminal for the line, said contact being normally insulated from the ground, a central source of current associated with the line and adapted to be included in the metallic circuit of the line when a connection exists to furnish current to the substation-transmitters for talking purposes, means for disconnecting said contact from the line when the line is not in use, means operated by current from said source to connect the contact with the line when the line is in use, and testing apparatus to coöperate with said contact to indicate the condition of the line, substantially as described.

21. The combination with a metallic telephone-line, of a plurality of talking-contacts forming portions of connection-terminals for said line, said terminals being arranged at the several sections of a switchboard, said contacts being connected together and normally insulated from ground, means for disconnecting said plurality of contacts from the line when the line is not in use, means to connect said contacts with the line when the line is in use, plug connectors located at the several sections, and a battery associated therewith, and adapted to be included in the metallic talking-circuit to furnish current for talking and for the operation of said connecting means, whereby when a plug at any section is inserted into a jack the potential of all of said contacts is raised, and means for testing the electrical condition of said contacts to ascertain the condition of the line, substantially as described.

22. The combination with a metallic telephone-line, of a plurality of spring-jacks therefor and each having a contact for each limb of said line, a contact in each jack being normally insulated from the line and from ground, a plug and cord-circuit coöperating with said jacks, a relay to connect said contacts with the line when actuated, a supervisory-signal-controlling magnet and a battery associated with said cord-circuit and a switch at the subscriber's station, all coöperating for the purposes of testing and signaling, substantially as described.

23. The combination with a telephone-line having a limb extending to the central office, of a plurality of spring-jacks therefor and each having contact adapted to form a portion of the line-circuit and normally insulated from line and from ground, a plug and cord-circuit coöperating with said jacks, a relay to connect said normally insulated contacts with the limb of the line when actuated, a supervisory-signal-controlling magnet and a battery associated with said cord-circuit, and a switch at the subscriber's station, whereby when a connection is made, said contacts are charged for the purposes of testing, said jacks are placed in operative relation with the line and said supervisory-signal-controlling magnet is placed under the control of the subscriber, substantially as described.

24. The combination with a metallic telephone-line, of a test-terminal therefor, a relay for disconnecting said test-terminal from the telephone-line when the line is not in use, a cord-circuit and a connecting-plug, a source of electricity bridged across said cord-circuit and adapted to send current over the metallic telephone-line to energize said relay and to charge said test-terminal, and testing apparatus adapted to coöperate with said test-terminal to indicate the condition of the line, substantially as described.

25. The combination with a telephone-line, of a test-terminal normally disconnected therefrom, a relay for connecting said test-terminal with the line, testing apparatus, a cord-circuit terminating in a connecting-plug, supervisory signal apparatus associated with the cord-circuit, a source of electricity also associated with the cord-circuit, and means for closing the circuit of said source over the telephone-line to operate the said supervisory apparatus and through said relay when connection is made with the line, said relay-circuit including one of the main terminals of the connecting-plug and a line-contact of the telephone-line with suitable return, substantially as described.

26. The combination with a telephone-line and a connection-terminal therefor normally not in operative relation with the line, of a connecting-plug and cord-circuit to coöperate with said line, a supervisory-signal-controlling magnet and a battery associated with said cord-circuit, a telephone-transmitter and a switch at the subscriber's station, and means controlled by the insertion of the plug into the jack for placing the jack in operative relation with the line by current flowing over a path including a portion of the talking-circuit, whereby talking-current is furnished to said transmitter and said magnet is placed under the control of the subscriber, substantially as described.

27. The combination with a telephone-line, and a connection-terminal therefor normally not in operative relation with said line, of a connecting-plug and cord-circuit adapted to coöperate with said line, a supervisory-signal-controlling magnet and a battery associated with said cord-circuit, a switch at the subscriber's station, and means including a contact connected with the talking-circuit controlled by the insertion of the plug into the jack for placing said jack in operative relation with the line, whereby said signal-controlling magnet is placed under the control of the subscriber, substantially as described.

28. The combination with a metallic telephone-line adapted to be included in a talking-circuit, of a line-signal and a cut-off relay for the line, a cord-circuit, a battery associated with the cord-circuit, and means for closing circuit through said relay over a portion of both sides of the talking-circuit when connection is made with the line to render the line-signal inoperative, substantially as described.

29. The combination with a metallic telephone-line adapted to be included in a talking-circuit, of a line-signal and a cut-off relay for the line, a battery, and means for closing circuit from said battery through said relay over a portion of both sides of the talking-circuit, including a portion of the telephone-line and the cord-circuit, substantially as described.

30. The combination with a telephone-line and a connection-terminal in the form of a spring-jack normally not in operative relation with the line, of a cord-circuit and a connecting-plug, a central source of current associated with said line and circuit to furnish talking-current to the substations, and means including said source of current actuated by the insertion of said plug in the jack and by current flowing over a part of the talking-circuit for placing said jack in operative relation with said line, substantially as described.

31. The combination with a telephone-line and a connection-terminal in the form of a spring-jack normally not in operative relation with said line, of a cord-circuit and connecting-plug, supervisory signaling apparatus associated with said circuit, a central source of current associated with said line and circuit to operate said supervisory apparatus, and a relay adapted to be energized from said source over a path including a portion of the talking-circuit to place said jack in operative relation with the line when said plug is inserted in said jack, substantially as described.

32. The combination with a telephone-line and a connection-terminal in the form of a spring-jack, of a connecting-plug and a cord-circuit, a central source of current associated with said line and circuit to furnish current for talking purposes, supervisory signal apparatus associated with the cord-circuit and operated from said source of current, and a relay actuated from said source by the insertion of said plug into and its withdrawal from said jack for controlling the operative relation of said jack with said line, said relay being actuated by current flowing over a portion of a strand of the cord-circuit, a talking-contact of the plug and jack and a portion of the telephone-line, substantially as described.

33. In a telephone system, a metallic-circuit line, a connection-terminal in the form of a spring-jack normally not in operative relation with said line, a connecting-plug and a cord-circuit, a signaling device normally in operative relation with said line, a central source of current and supervisory signaling apparatus associated with said line and cord-circuit, said source being adapted to furnish current for the operation of said apparatus and for talking purposes, and a relay actuated from said source over a portion of the talking-circuit when said plug is inserted in said jack to place said signaling device in inoperative relation with said line and said jack in operative relation with said line, substantially as described.

34. The combination with a telephone-line having a limb extending to the central station, of a line-contact for said limb normally disconnected therefrom, a cord-circuit and connecting-plug, supervisory signaling apparatus connected with said circuit, a central source of current associated with said line and circuit to furnish current for talking purposes and for the operation of said supervisory apparatus, and means actuated over a portion of the talking-circuit for automatically connecting said line-contact with said limb when the line is in use and for disconnecting the same therefrom when the line is not in use, substantially as described.

35. The combination with a telephone-line having a limb extending to the central station, of a signaling device normally connected with said limb, a line-contact for said limb normally disconnected therefrom, a cord-circuit and connecting-plug, supervisory signaling apparatus associated with said cord-circuit, a central battery to furnish current for talking purposes and for the operation of said apparatus, and a relay energized from said battery and connected directly to the talking-circuit and adapted to disconnect said limb from said signaling device and to connect the same with the line-contact when a connection is established with the line, substantially as described.

36. The combination with a telephone-line having a limb extending to the central station, of a spring or moving part with which said limb connects at the central office, a signaling device connected with said spring or part in its normal position, a line-contact for said limb, a cord-circuit and connecting-plug, a central battery associated with the said line-circuit, supervisory signals also associated with the circuit, said battery being adapted to furnish current to the substations for talking purposes and for operating said supervisory signals, and a relay also energized from said battery over a circuit including a portion of one side of the talking-circuit and adapted to disconnect said spring or part from the signaling device and to connect it with the line-contact when a connection is established with the line, substantially as described.

In witness whereof I have hereunto subscribed my name in the presence of two witnesses.

FRANCIS W. DUNBAR.

Witnesses:

G. BEDER,

ROBERT LEWIS AMES.